Dec. 12, 1933.  J. K. CLUTTS  1,938,580
BLAST FURNACE AND PROCESS OF CHARGING SAME
Filed March 27, 1931  2 Sheets-Sheet 1

INVENTOR
Joshua K. Clutts
BY
ATTORNEY

Patented Dec. 12, 1933

1,938,580

UNITED STATES PATENT OFFICE 1,938,580

BLAST FURNACE AND PROCESS OF CHARGING SAME

Joshua K. Clutts, Detroit, Mich.

Application March 27, 1931. Serial No. 525,685

11 Claims. (Cl. 266—27)

This invention relates to blast furnaces and methods of charging and operating the same.

An object of the invention is to charge a blast furnace with ore, fuel, and scrap metal in a sequence and relative volume tending to appreciably improve the grade of resulting iron, as compared to prior methods.

Another object is to deliver pre-roasted ores to a blast furnace and to so intersperse such ores with fuel and scrap metal as to produce a grade of iron suitable for castings, without additional refinement.

A further object is to charge a blast furnace with ore, fuel and scrap metal and to maintain portions of said ore and fuel, throughout reduction of the charge, in a surrounding relation to the scrap metal, whereby scouring of the furnace lining by the scrap and resultant deterioration of the lining is avoided.

Still another object is to provide improved means for cooling a blast furnace feed hopper and its bell closure.

A still further object is to combine in one unit a furnace-charging hopper, and a bell closure for another such hopper.

A still further object is to provide a blast furnace with two coaxial hoppers, so disposed one within another as to assure a discharge of material from the inner hopper in a central relation to the material delivered from the surrounding hopper.

These and various other objects the invention attains by the construction hereinafter described, and illustrated in the accompanying drawings.

Fig. 3 is a cross sectional view of said hopper and closure mechanism taken upon the line 3—3 of Fig. 2.

Fig. 4 is a cross section of a combined supporting rod and water duct, carrying one of said bell closure members, taken on the line 4—4 of Fig. 2.

Figure 1:
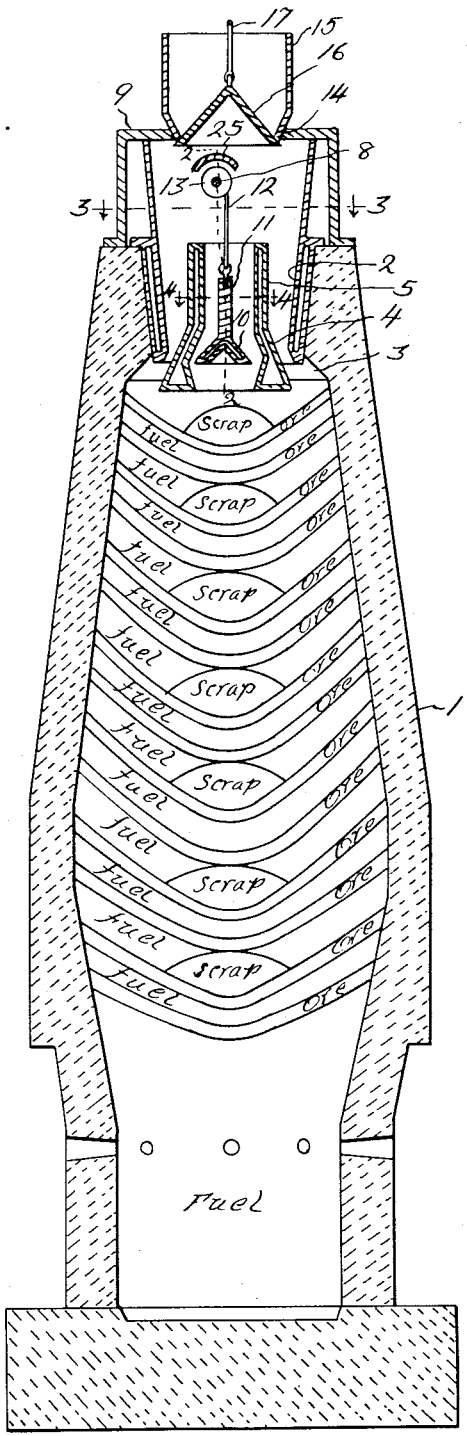
Fig. 1 is a view of the improved blast furnace in axial sectional elevation, illustrating diagrammatically an improved method of charging in ore, fuel, and scrap metal, in a certain sequential and volumetric relation.
Figure 2:
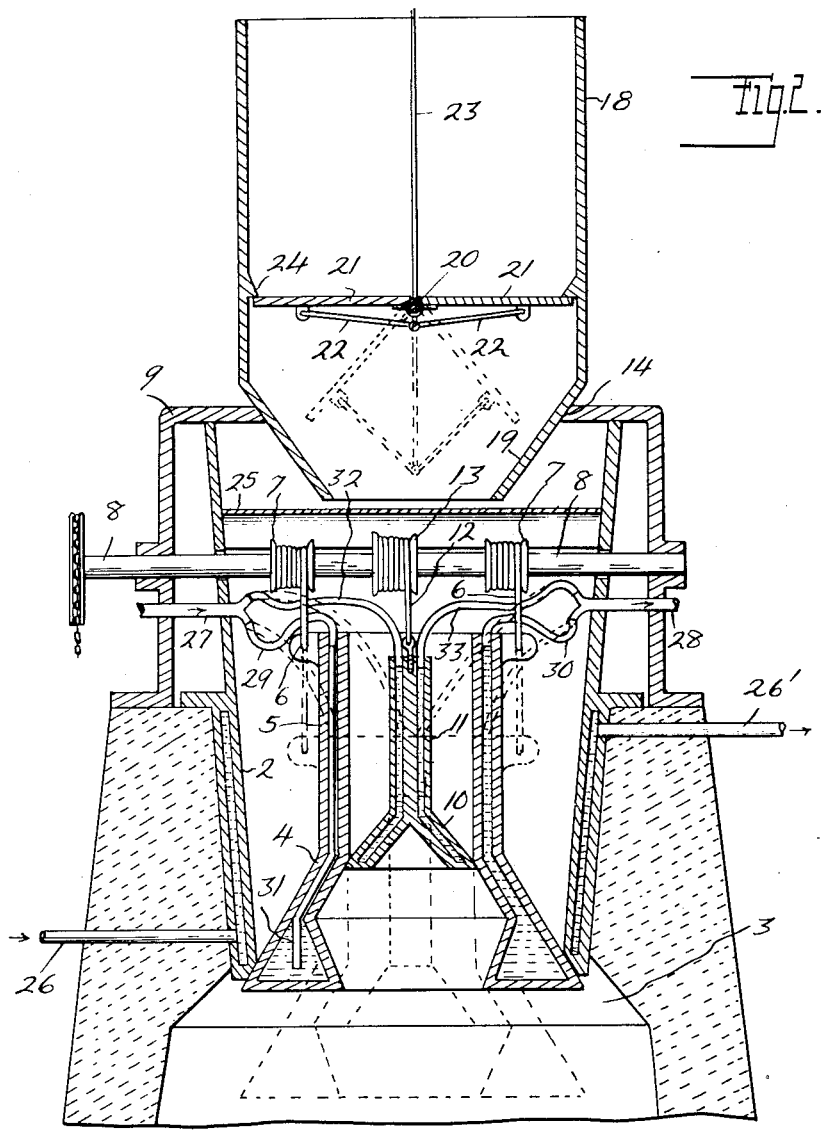
Fig. 2 is an axial sectional elevation of the hopper and bell closure mechanism of said furnace, showing a bucket used alternately with that shown in Fig. 1, the section being taken on the line 2—2 of Fig. 1.

In these views, the reference character 1 designates a blast furnace distinguished from the majority of present blast furnaces by its reduced height. This feature is made possible primarily by roasting or calcination of the ores preliminary to their delivery to the improved furnace, whereby they are relieved of considerable volatile matter and their volume is much reduced in proportion to their iron content. Thus, a charge of the roasted ores productive of a required tonnage of iron can be accommodated in a furnace of considerably less volume than would be necessary to derive such tonnage from ores in their approximate natural state.

Furthermore, the preliminary roasting of the ore shortens the necessary reduction period within the furnace, and thus lends itself to adoption of a stack shorter than required by prior practice.

It is highly desirable where high grade iron is sought, to charge the furnace with a certain proportion of metal scrap, as well as ore and fuel, but heretofore use of scrap has been quite limited, because of its tendency, in working down through the furnace, to scour and deteriorate the lining of the latter.

It is here to be noted that replacement of a blast furnace lining is exceedingly expensive, and every possible precaution is commonly exercised to prolong life of such lining.

The present invention provides a method for interspersing scrap metal with the fuel and ore charges so as to thoroughly safeguard the furnace lining against damage by said metal. Furthermore, the present method establishes a sequence and volumetric relation between the charges of fuel, ore and scrap metal conducive to the production of iron of sufficiently high grade and fine grain for direct use in making castings, without the usual additional refinement. Thus, as clearly appears in Fig. 1, two charges of ore and two charges of fuel are introduced in alternation into the furnace for each charge of scrap metal, and the last mentioned charge is delivered coincidentally with or subsequently to another charge of ore and one of fuel, which ore and fuel charges surround the scrap metal and center it about the furnace axis, remote from the furnace wall, whereby the scrap metal in working down through the furnace is kept completely out of contact with said wall.

Also, by charging in this manner, several strata of fuel and ore are interposed between consecutive charges of scrap metal, and since the rapidity of reduction of the ore is less rapid than that of the scrap, downward progress of the scrap metal is retarded, and the desired relative proportions are maintained throughout the entire depth of the charge. This promotes uniformity in the composition of the resulting iron.

It is, of course, to be understood that in the diagrammatic showing of Fig. 1, no attempt is made to disclose the progressive combustion of and liquefaction of the ore and metal in the course of their descent.

Referring now to the mechanism for charging the furnace, as has been described, 2 designates a hopper fitting snugly into the furnace mouth 3. as a closure for the lower end of said hopper, there is provided a bell member 4 from which rises rigidly and preferably integrally a relatively small hopper 5, coaxially within the hopper 2.

For supporting the member 4, 5 and actuating it to open and close the hopper 2, a pair of cables 6 are attached to the upper end of the hopper 5 in diametrically opposed relation, and are arranged to wind on a pair of drums 7, fast on a horizontal shaft 8 extending through and journaled in a cylindrical hood 9 surmounting the furnace.

As a closure for the inner hopper 5, there is provided a bell member 10 coacting with the lower end of said hopper, and provided at its apex with an upstanding supporting shank 11, from which a suspending cable 12 extends to a third drum 13 fast on the shaft 8. Thus, by rotation of said shaft, the unit 4, 5 and the small bell member 10 may be raised or lowered, and it is preferred to construct the drum 13 of a diameter sufficiently larger than that of the drums 7 to insure a desired opening or closing travel of the bell member 10 relative to the hopper 5, coincident with the required opening or closing travel of the unit 4, 5 relative to the outer hopper 2.

The hood 9 is adapted to seat one or more buckets for charging material into the described hoppers, and for this purpose said hood is formed in its top with a circular opening 14. In Fig. 1 is illustrated a bucket 15 seated on the casing 9 for delivering fuel or ore to the hopper 2. Said bucket has a bottom opening controlled by a bell closure 16 which is suspended by a cable 17 controlling its opening and closing travel. Said bucket may be transported to and from the blast furnace by a cable, mono-rail, or any other desired support.

For charging scrap metal into the inner hopper 5, there is provided another bucket 18 having a funnel-shaped bottom portion 19 formed with a central outlet. Diametrically mounted within said bucket is a horizontal rod 20 which pivots a pair of complementary semicircular closure members 21. These are connected by links 22 to a control rod 23 extending axially upward through said bucket. Thus, when an upward stress is applied to the rod 23, the closure members 21 occupy the horizontal position shown in full lines in Fig. 3, engaging stops 24 upon the interior wall of the bucket, and upon relief of such stress said closures are free to swing downward to the dash line position of Fig. 3, permitting the contents of the bucket to discharge. The funnel shape of the lower portion of the bucket 18 tends to converge the discharging scrap metal about the axis of the furnace, so as to assure its entry into the scrap hopper 5.

In order to protect the shaft 8 and drums 7 and 13 from downwardly discharging materials, a sheet metal guard 25 is extended through the casing 9 closely above said shaft and drums, said guard inclining slightly downward at each side of the shaft to deflect the discharging material laterally.

It is desirable to make provision for cooling the hoppers 2 and 5 and bell members 4 and 10 to prevent their warping, due to furnace heat. Therefore, said parts are each of double walled construction, forming a water circulation chamber between their walls. Pipes 26 and 26' serve respectively to deliver water to and exhaust it from the hopper 2. Similarly, pipes 27 and 28 provide for delivery and exhaust of water to and from the combined bell member and hopper 4, 5 and the bell member 10 through suitable connections 29, 30, 32 and 33. Said connections are flexible to permit requisite vertical travel of the members 4, 5 and 10.

In charging the described blast furnace, the bucket 15 is employed to deliver to the hopper two charges of ore and two charges of fuel in the alternating relation illustrated in Fig. 1. An additional charge of ore and one of fuel are then delivered to the hopper 2, and the inner hopper 2 is charged with scrap metal. The shaft 8 is then rotated to simultaneously lower the member 4, 5 and the bell member 10, whereby both hoppers discharge their contents concurrently into the furnace, the coke and ore assuming a surrounding relation to the scrap metal, as Fig. 1 illustrates. There is then again introduced two charges of ore and two charges of fuel in alternation, whereupon a further charge of scrap metal is delivered, as before, in conjunction with a charge of ore and fuel, this being continued until the desired total volume has been attained.

It will of course be understood that a proper proportion of lime or some equivalent flux will accompany each charge of ore introduced into the furnace.

Considerable variation is of course possible in the relative percentages of the various charging materials, depending upon the iron content of the ore and upon the desired grade of the iron to be run. For a high grade of iron, of relatively fine grain, for castings, the ore, if of average quality, may exceed the scrap metal approximately two to one by weight. For making regular grades of pigiron, a lesser percentage of scrap metal will be employed.

It is a feature of the disclosed method that the pre-roasted ores are to be delivered to the furnace without substantial loss of the heat which they acquire in the course of pre-roasting. This not only decreases the necessary use of fuel within the blast furnace but also tends, in the presence of an adequate air blast, to eliminate formation of carbon monoxide.

Because of the adaptability of the described charging method and apparatus to produce a high grade of iron, said method and apparatus have a particular application to use in making castings directly from the furnace output.

While it is apparent that the illustrated embodiment of my invention is well calculated to adequately fulfill the objects and advantages primarily stated, it is to be understood that the invention is susceptible to variation, modification and change within the spirit and scope of the subjoined claims.

What I claim is:

1. The method of charging a blast furnace consisting in delivering successive charges of scrap metal to the furnace in proximity to the vertical axis of the furnace, and in delivering other materials to the furnace in a surrounding relation to the scrap metal, whereby the latter is maintained clear of the furnace lining.

2. The method of charging a blast furnace consisting in delivering successive charges of scrap metal to the furnace in proximity to the vertical axis of the furnace, and in delivering successive charges of fuel and ore to the furnace between the furnace lining and the scrap metal whereby the latter is maintained clear of the furnace lining.

3. The method of charging a blast furnace consisting in delivering to the furnace substantially axially thereof and in spaced relation to the furnace wall, successive charges of scrap metal and in delivering several alternating charges of ore and fuel to the furnace between the consecutive charges of scrap metal, and in a surrounding relation to the scrap metal.

4. The method of charging a blast furnace consisting in delivering successive charges of scrap metal into the region adjacent the vertical axis of the furnace, and in delivering fuel and ore in proximity to the furnace lining, and in a surrounding relation to the scrap metal.

5. In a blast furnace having a charging opening in its top, a hopper snugly fitting in said opening, a second hopper of lesser diameter disposed within the first mentioned hopper, a closure for the outer hopper carried by the inner hopper, a closure for the inner hopper, and means for raising and lowering the inner hopper to control a discharge from the outer hopper and for raising and lowering said closure of the inner hopper.

6. In a blast furnace having a charging opening in its top, an outer hopper within said opening, a second hopper within the outer hopper and of lesser diameter, a closure for the outer hopper carried by said inner hopper, and means for raising and lowering the inner hopper and said closure as a unit to regulate discharge from the outer hopper.

7. The combination with a blast furnace having a charging opening in its top, of a pair of coaxial, spaced hoppers arranged in said opening for receiving diverse materials, closures for said hoppers, and means for operating said closures in common.

8. The combination with a furnace having a charging opening in its top, of an inner and an outer hopper for charging diverse materials through said opening, a closure for the outer hopper carried by and forming a unit with the inner hopper, a closure for the inner hopper, a shaft journaled substantially horizontally above said furnace, and flexible connections from said unit and inner hopper closure to said shaft for raising and lowering said unit and closure.

9. In a blast furnace, a charging hopper, a closure for said hopper formed with an interior fluid chamber, and means for circulating a cooling fluid through said chamber.

10. In a blast furnace, a charging hopper, a bell closure for said hopper having an interior fluid chamber, means for raising and lowering said closure to regulate discharge from the hopper, and fluid supply connections to and from said chamber, flexible to provide for raising and lowering of said closure.

11. The method of charging a blast furnace consisting in delivering successive charges of scrap metal to the furnace in proximity to the vertical axis of the furnace, and in delivering a charge of fuel and ore to the furnace between each two consecutive charges of scrap metal, the fuel and ore being charged against the furnace wall throughout its peripheral extent, and consequently forming an approximately funnel-shaped pocket, tending to retain the scrap metal charge centered substantially at the furnace axis.

JOSHUA K. CLUTTS.